US005247726A

United States Patent [19]

Harmand

[11] Patent Number: 5,247,726

[45] Date of Patent: Sep. 28, 1993

[54] GRIPPER TOOL FOR ENGINE VALVE DISASSEMBLY/ASSEMBLY

[76] Inventor: Brice Harmand, 3732 W. Century Blvd., Unit 1, Inglewood, Calif. 90303

[21] Appl. No.: 935,882

[22] Filed: Aug. 26, 1992

[51] Int. Cl.[5] ........................................ B23P 19/04

[52] U.S. Cl. ................................................ 29/249

[58] Field of Search ............... 29/888.4, 888.42, 213.1, 29/214, 221.6, 254, 255, 240, 281.1, 281.4, 281.5, 281.6, 282, 283, 249; 269/8, 287, 45

[56] References Cited

U.S. PATENT DOCUMENTS

| | | | |
|---|---|---|---|
| 1,536,601 | 5/1925 | Anderson | 29/249 |
| 2,091,500 | 8/1937 | Clark | 29/249 |
| 3,315,339 | 4/1967 | Young | 29/249 |
| 3,316,623 | 5/1967 | Clark | 29/249 |
| 3,621,553 | 11/1971 | Lafeber | 269/8 |

*Primary Examiner*—Robert C. Watson

*Attorney, Agent, or Firm*—Brown, Martin, Haller & McClain

[57] ABSTRACT

The gripping tool has a base consisting of a flat ring onto which are mounted three posts extending upwardly therefrom. Rotatable and slidable clips with magnets are mounted on at least two of the posts to capture the loosened key bolts. A plate is attached to the top of the posts and a clip may extend upwardly therefrom to permit attachment of an adapter for use with a drill press. The flat ring is centered over the top of the valve stem and key bolt and rests on top of the upper cup which presses against the top of the ring which retains the spring. Force applied to the top of the tool presses down on the upper cup to release the key bolt.

4 Claims, 2 Drawing Sheets

GRIPPER TOOL FOR ENGINE VALVE DISASSEMBLY/ASSEMBLY

BACKGROUND OF THE INVENTION

The overhaul of internal combustion engines is an expensive, difficult and time-consuming process. Virtually all internal combustion engines include valves which are operated against spring pressure, and there are at least two valves for each cylinder. Thus, in order to disassemble and reassemble the engine, and specifically the cylinder head, means must be provided to manipulate the valves so that the springs can be removed or attached. These springs are fairly stiff and require a considerable amount of force to be applied to the valve by way of a specialized clamp. This clamp spans a portion of the cylinder head so that it reaches both the valve face and the spring, simultaneously lifting the valve and compressing the spring. Since engines are configured in many different ways, valve locations can vary so that a clamp is required for each type of engine to be serviced, and different valves within a single engine introduce further variables and requirements due to the shape of the engine. This can result in considerable expense to a mechanic just to have one clamp for each valve arrangement. Further, if the mechanic only has one clamp for a particular valve arrangement, the valves must be disassembled/reassembled serially, making the procedure tedious and time consuming. Thus, duplicate tools may be required. The added tool and labor costs contribute to the time and expense involved in an engine overhaul.

In co-pending applications Ser. Nos. 07/855,098 and 07/915,018, the present inventor disclosed a method and apparatus for facilitating the assembly/disassembly of engine valves. application Ser. No. 07/855,098 described the procedure for introducing high pressure gas into the combustion chamber of the cylinder head to force the valves outward, compressing the valve springs, to facilitate removal of the key bolt. In the invention of application Ser. No. 07/915,018, the inventor utilized a deformable bladder which expands upon the introduction of a fluid, typically air, to fill the combustion chambers and force the valves outward.

Another step in the assembly/disassembly of engine valves is the actual removal of the key bolts, or locks, which retain the springs on the valve stems. A number of methods are used to accomplish this. In many garages and shops, drill presses are used to supply downward pressure on the upper cup which retains the spring to free the key bolt. The popularity of this practice is primarily due to the fact that many shops have drill presses, and may not have other more appropriate tools. This improvisation, however, puts the valves, and possibly the drill press, at risk, since the work area of the drill press is not intended to handle cylinder heads. Another technique involves striking the end of the valve stem or the upper cup with an inertia hammer. Besides being hazardous to the valves, and somewhat "inexact", there is a risk in these procedures of losing the key bolt after it comes loose.

SUMMARY OF THE INVENTION

It is an advantage of the present invention to provide a device which facilitates removal of the key bolt during engine valve disassembly.

It is another advantage of the present invention to provide a device which retains the key bolt after it is released from the valve stem.

A further advantage of the present invention is to provide a device which presents the key bolt in an easily accessible position for replacement on the valve stem.

In an exemplary embodiment the gripping tool has a base consisting of a flat ring onto which are mounted three posts extending upwardly therefrom. Rotatable and slidable clips with magnets are mounted on at least two of the posts to capture the loosened key bolts. A plate is attached to the top of the posts and a clip may extend upwardly therefrom to permit attachment of an adapter by which the device can be rotated for optimal access to the key bolt. For use, the flat ring is centered over the top of the valve stem and key bolt and rests on top of the upper cup which presses against the top of the ring which retains the spring.

To loosen the key bolt with the device in place the magnetic clips are positioned near the key bolt so that the key bolt segments will be magnetically drawn to the magnets after release. The top of the device is struck with the inertia hammer, pushing down on the upper cup and spring to release the key bolt segments. The key bolt segments are drawn toward the magnetic clips and the spring and upper cup expand upward to be easily lifted off of the valve stem after the device is removed.

For reassembly, the device is centered over the spring and upper cup which have been placed on the valve stem. The key bolt segments are held by the magnetic clips. By applying downward force onto the top of the device, the spring is depressed, allowing access to the top of the valve stem. The magnetic clips are slid downward on the posts so that the key bolt segments are positioned at the proper location of the valve stem. The key bolt segments are then released to wedge against the valve stem in the center of the upper cup, and the downward force is released, firmly wedging the key bolt against the valve stem to hold the spring at its desired level of compression.

The base of the device can have a number of different inner and outer diameters for use with cylinder heads having different spring, valve and key bolt sizes.

When a drill press is used to provide the downward force for loosening the key bolt, an arbor at the top of the adapter is inserted into the drill-chuck. The adapter will permit a firm grip by the drill-chuck while applying downward pressure on the upper cup to free the key bolt, with the magnetic clips catching the key bolt segments as they are released.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 6:
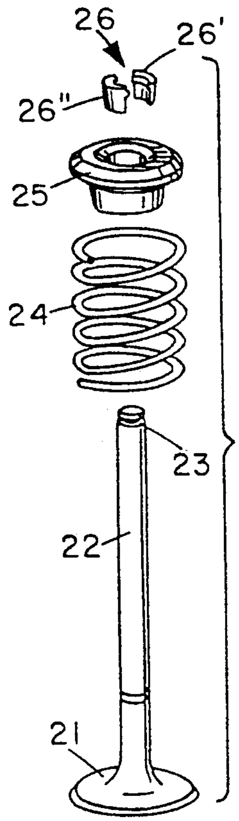
FIG. 6 PRIOR ART
FIG. 6 is an exploded view of a valve assembly (prior art).

FIG. 6 provides a reference to show the relative locations of the components of a valve assembly of the prior art which are of interest in the present invention. Valve 21 has valve stem 22 with notch 23. Spring 24 slides over valve stem 22 and is held in place by upper cup 25 and key bolt 26 made up of segments of 26' and 26".

Figure 1:
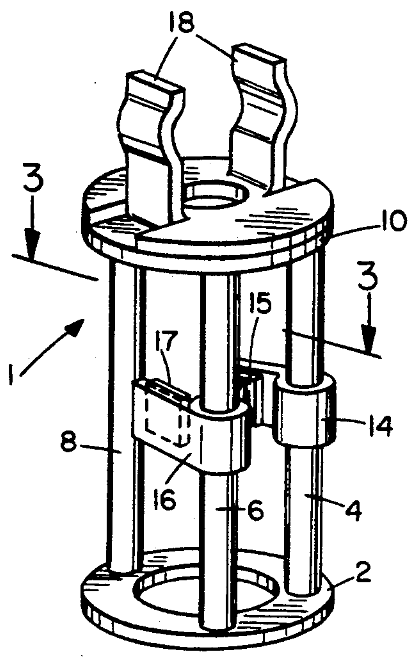
FIG. 1 is a perspective view of the device of the present invention.

As illustrated in FIG. 1, the gripper tool 1 of the present invention has a base 2 which is a flat ring onto which are mounted three posts 4, 6 and 8. The posts 4, 6 and 8 extend upward to top plate 10. Two magnetic clips 14 and 16 are fitted onto post 4 and 6 so that they will rotate horizontally around the posts and slide vertically on the posts. Magnets 15 and 17 are disposed toward the free ends of magnetic clips 14 and 16, respectively.

Figure 3:
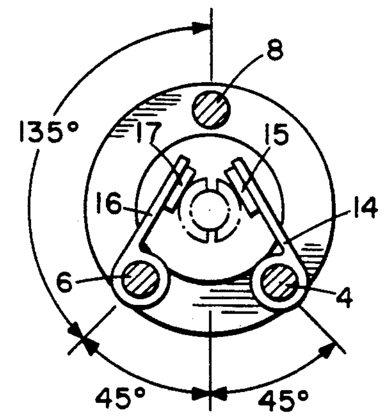
FIG. 3 is a cross-sectional view taken along line 3—3 of FIG. 1.

As can be seen in FIG. 3, posts 4, 6 and 8 need not be spaced evenly around base 2. While it is possible to provide a functional tool with even spacing, the larger spacing between post 8 and posts 4 and 6 provides better visibility and accessibility as compared to an evenly-spaced arrangement. A suggested spacing is 135° each from post 8 to post 4 and from post 8 to post 6. Also, as few as two or more than three posts can be used as long as they have sufficient strength and adequate working room is provided.

The posts 4, 6 and 8 are preferably cylindrical, but may be any generally-rounded shape which permits free rotation of the magnetic clips 14 and 16 around their corresponding posts. The length of the posts should be sufficient to accommodate the protruding length of the valve stem 22 when the spring 24 is fully compressed, as in FIG. 4. The material of which the posts must provide high compression resistance and be able to withstand the impact of the inertia hammer used to loosen the key bolts.

Figure 2:
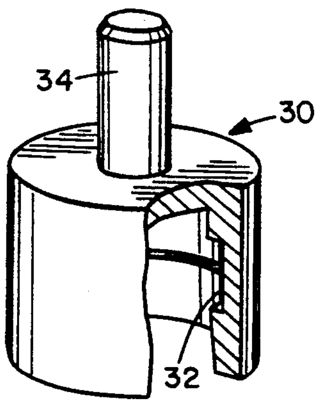
FIG. 2 is a perspective view, partially cut-away, of an adapter to the present invention.

Clips 18 may be attached or formed on top of top plate 10 to permit attachment of adapter 30 for use with a drill press. As illustrated in FIG. 2, clips 18 are spring metal or other similarly resilient durable material which will snap into groove 32 of adapter 30 when adapter 30 is pressed down over the top of the clips 18. Groove 32 is circular, running around the entire inner wall of adapter 30, so that the device 1 can be rotated a full 360° while using the adapter. Adapter 30, illustrated in FIG. 2, is held by a sliding clamp 62 which can be attached to an inertia hammer 40 to loosen the key bolts 26 from the valve stem 22 as in FIGS. 4 and 5. The arbor 34 which extends upward from adapter 30 is inserted into the chuck of a drill-press. Even though the arbor 34 is firmly locked in the drill-chuck, the configuration of the clips 18 and groove 32 permit the device 1 to be rotated to obtain the best possible access to the key bolt through the posts. By lowering the chuck of the drill-press the device 1 is forced downward to transfer the force to upper cup 25, thus loosening the key bolt.

Figure 4:
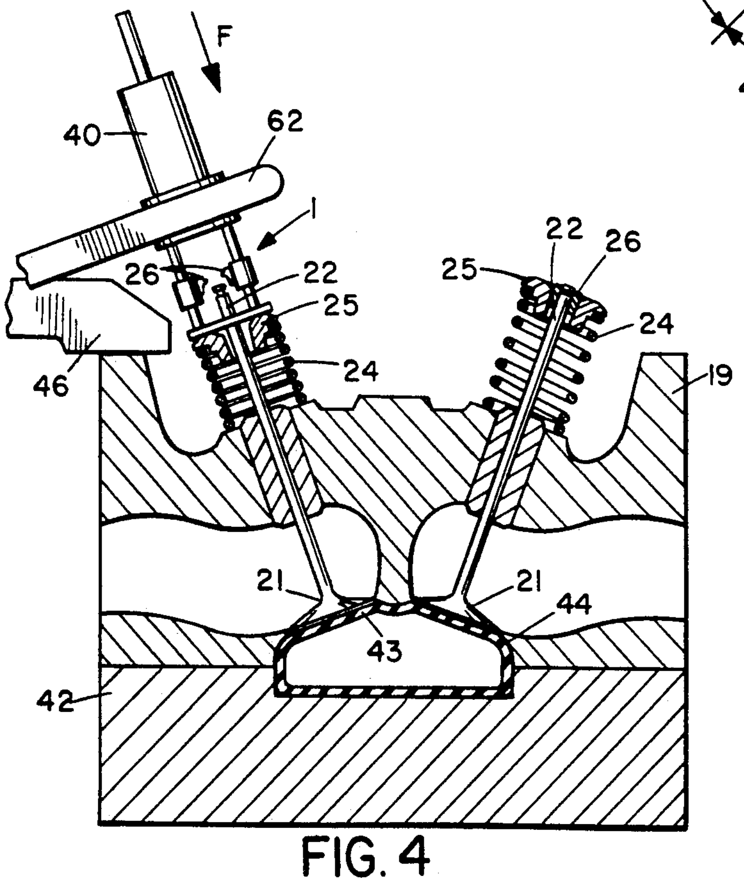
FIG. 4 is a diagrammatic view of the present invention as used in disassembly of a valve in a cylinder head.

FIG. 4 illustrates the use of the gripper tool 1 for removal of the key bolt 26 from valve stem 22 as assembled into cylinder head 19 The following description describes the device's use in conjunction with the invention disclosed in co-pending application Ser. No. 07/915,018, however, the device of the present application is also applicable to conventional techniques which use clamps or other hardware to lift the valves 21 to permit removal of the key bolts.

The cylinder head 19 is placed on table 42 into which is built a deformable bladder or membrane 43. With the chambers 44 centered over the bladder, the cylinder head 19 is firmly held onto table 42 by clamps 46. Sliding panels within the table 42 expose only as much of membrane 43 as is needed for the particular cylinder head. The membrane 43 is inflated by a hand pump to fill chambers 44 and lift valves 21. The membrane 43 is sealed by closing a valve to the hand pump so that the air is retained therein.

The gripper tool 1 is placed on top of upper cup 25 so that it is centered over the valve stem 22. Gripper tool 1 is connected to the inertia hammer 40 by a sliding clamp 60 which allows positioning of the gripper tool 1 along the cylinder head as necessary. The magnetic clips 14 and 16 are moved to a position near the key bolt 26.

The inertia hammer 40 is activated so that force F is applied to the top of gripper tool 1. Base 2 pushes down on upper cup 25 with an impact that breaks the compressive force of the inner diameter of upper cup 25 on the key bolt 26 and the valve stem 22. The key bolt segments 26' and 26" are loosened such that when the spring 24 resiles after the impact they are loosely carried upward on top of the upper cup 25. The loose key bolt segments are attracted to magnetic clips 14 and 16 and retained there until removed by the user, usually with tweezers or needle-nose pliers. If the attraction of magnets 15 and 17 is not sufficient to pick up the key bolt segments, because the distance between them is excessive, the magnetic clips 14 and 16 can be moved vertically and/or rotated horizontally to a position which permits the attraction of the key bolt segments 26' and 26".

Figure 5:
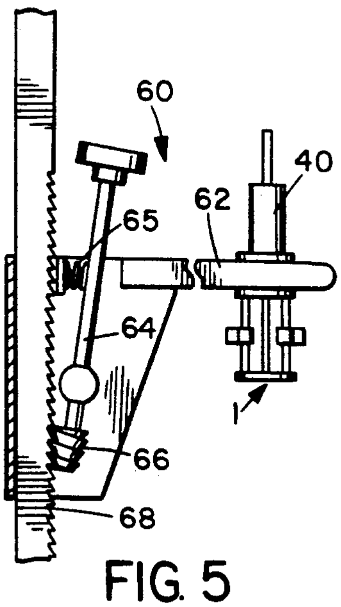
FIG. 5 is a diagrammatic view of a support/placement mechanism for of the present invention.

The support/placement mechanism 60 illustrated in FIG. 5 permits rapid movement from one valve to another across the cylinder head. Sliding clamp 62 extends from mechanism 60 to hold the gripper tool 1 and inertia hammer 40. For rapid movement of the gripper tool 1, handle 64 is depressed so that it pivots on spring 65 to release screw 66 from toothed rack 68. For more precise positioning, and to provide a constant compressive force on the upper cup 25 for reassembly of the valve, handle 64 is turned so that the screw 66 guides the mechanism 60 up or down along toothed rack 68. Movement of the mechanism 60 downward applies gradual pressure to the gripper tool 1 which transfers the force to upper cup 25 and spring 24 to compress spring 24 to allow key bolt segments 26' and 26" to be inserted at the notch 23 of valve stem 22. The pressure is then gradually released by moving mechanism 60 upward by turning handle 64.

During reassembly of the valves, the key bolt segments 26' and 26" can be retained by magnets 15 and 17 so that they are readily available and accessible for installation.

The gripper tool of the present invention provides means for disassembly valves from cylinder heads easily and efficiency when used in combination with the device disclosed in co-pending application Ser. No. 07/915,018, and can even improve currently-practiced methods of valve disassembly. Key bolts are very small, difficult to handle and easily lost. The gripper tool can virtually eliminate loss of key bolts during disassembly. The gripper tool also provides an efficient means for applying force to the upper cup to release the key bolt, and to provide compression of the valve spring to permit reassembly. Finally, the gripper tool presents the key bolts in the proper position for reassembly.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A device to facilitate removal/replacement of a key bolt from a valve stem for disassembly/assembly of a valve in an engine cylinder head comprising:

a flat ring having an outer diameter and an inner diameter, said outer diameter being substantially the same as a diameter of a retaining ring which retains a spring on said valve stem and said inner diameter being larger than an outer diameter of said key bolt;

a plurality of posts mounted on said flat ring and extending upwardly therefrom;

a plurality of magnetic clips slidably and rotatably disposed on at least two of said plurality of posts; and a top plate attached to said plurality of posts in a parallel relationship with said flat ring.

2. A device as in claim 1 wherein said plurality of posts comprises three posts.

3. A device as in claim 1 further comprising an adapter for attachment to said top plate to facilitate attachment of said device to a drill press.

4. A device as in claim 2 wherein said three posts are disposed at an uneven spacing around said flat ring.

* * * * *